UNITED STATES PATENT OFFICE 2,108,725

ASSISTANT FOR THE TREATMENT OF TEXTILES

Alfred Rieche, Wolfen, Kreis Bitterfeld, and Karl Brodersen, Matthias Quaedvlieg, and Hans Maier-Bode, Dessau in Anhalt, Germany, assignors to I. G. Farbenindustrie Aktiengesellschaft, Frankfort-on-the-Main, Germany No Drawing. Application April 19, 1935, Serial No. 17,336. In Germany April 21, 1934

7 Claims. (Cl. 252—1)

Our present invention relates to new products which are useful as assistants in the treatment of fabrics, yarns, and similar textiles, and more particularly it relates to emulsifying, cleansing, wetting and softening agents used in the textile industry.

We have found that fatty acids the alkali salts of which show the behavior of soaps, or the functional derivatives of these acids, such as the esters, amides, and reaction products obtainable by treating the corresponding acid chlorides with a primary or secondary amino carboxylic acid or amino sulfonic acid, may be essentially improved in their action as emulsifying agents, cleansing agents, softening agents, and equalizing agents by introducing a hydrophilic radicle into the methylene group adjacent to the carboxyl group. These modified products are exceptionally useful for the purposes in question. It is assumed that the dipolaric character of these compounds which causes the effectiveness of such products, is increased by this substitution, a fact which is shown by the improved properties of the end products.

This observation is surprising, since the presence of hydrophilic radicles as, for instance, the hydroxy group, in a position further from the carboxy group has no influence in the said sense. Thus, for instance, the mono- and di-hydroxy stearic acids as obtainable from hardened castor oil or by oxidation of oleic acid, are completely insoluble in water, while the α-hydroxy stearic acid yields in the form of the free acid a high viscous aqueous solution. Even in the presence of free mineral acids this compound still yields a foaming solution.

Our new products correspond to the general formula

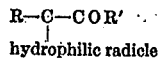

In this formula the grouping R—C—CO— is the radicle of a fatty acid the alkali salts of which show the behavior of a soap, R' means ·OH, an alcohol radicle or the radicle of a substituted or unsubstituted amine. The hydrophilic radicle in this formula may be, for instance, oxygen, in which case the compound in question is a derivative of a keto carbonic acid. However, in the most cases the hydrophilic radicle is a univalent group and then the carbon atom next the carboxyl group has bound one hydrogen atom. As such univalent radicles there come in question the group —O—Z, wherein Z means hydrogen or the radicle of a monohydric or polyhydric alcohol which may be further substituted, for instance, may be etherified; in this latter case this hydrophilic radicle may be a poly-ether.

Further hydrophilic radicles are the following:

wherein Z and Z' mean hydrogen, alkyl, substituted alkyl, thus including polyamines;

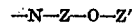

wherein Z means alkylene, Z' is hydrogen or alkyl;

wherein Z is alkylene, Z' stands for hydrogen or alkyl and X is the radicle —COOH or —SO₃H.

Finally we enumerate the radicle

wherein Z means hydrogen or alkyl, $x$ is OH or the radicle of an acid.

The hydrophilic behavior of the end products may be further increased by introducing into the hydrophilic radicle or into the radicle combined with the CO-group (R' of the first formula given above) an acid group such as, for instance, —COOH, —SO₃H, —OSO₃H, —OPO₃H₂, —SSO₃H. In these substituents the carbon chain may be interrupted by other atoms, such as oxygen, sulfur, nitrogen.

The products mentioned above, are obtainable by starting from the α-halogeno fatty acids, the esters or other functional derivatives thereof. By the treatment with an alkali, the halogen in the α-position with respect to the CO-group may be substituted by the OH-group. In a similar manner etherification may be performed by treating the α-halogeno fatty acid with a mono- or polyhydric alcohol in the presence of an alkali. The products containing a keto group in the α-position, are obtained by treating a fatty acid chloride with hydrocyanic acid or with an alkali metal cyanide and by saponification of the nitrile obtained. The compounds containing nitrogen in the hydrophilic radicle are produced by reacting the α-halogeno fatty acids or the functional derivatives thereof with the corresponding amino compound. Such compounds as contain in the hydrophilic radicle an acid group, are produced by double decomposition of an α-halogeno fatty acid with amino acids, such as amino acetic acid, diglycolamic acid, sarkosine, tyrosine, zysteine, di- and polypeptides, albumen and its degradation products, anthranilic acid, taurine, methyl taurine, phenyl taurine, sulfanilic acid. However, similar products are likewise obtainable by reaction of α-hydroxy or α-amino fatty acids with halogeno carboxylic acids or halogeno sulfonic acids or the corresponding acid chlorides; in the latter case the products can be caused to react with sodium sulfite, sodium thiosulfate or potassium cyanide.

Furthermore, the product obtainable by double decomposition of an α-bromo fatty acid or the ester thereof with monohydroxy ethylamine may be esterified with, for instance, sulfuric acid. The α-amino fatty acids may be treated with chloroacetylchloride and then converted into stable valuable assistants for textiles by successive treatment with sodium sulfite.

Finally, salt-forming groups may be introduced into the radicle R' of the formula given above, whereat a further improvement of the said assistants is attained. Such products are obtainable, for instance, by double decomposition of the carboxylic acids, the salts or functional derivatives thereof, such as, for instance, chlorides, anhydrides, or esters, containing in the α-position the hydrophilic group, with ethylene diamine, polyethylene amines, aminoethane sulfonic acid (taurine), methylaminoethane sulfonic acid, hydroxyethane sulfonic acid, methyl amino acetic acid or sulfanilic acid, if desired, with a simultaneous or additional treatment with an acid or an alkali. Analogous products are obtainable when starting from the α-halogeno, α-hydroxy or α-amino acids and then introducing the hydrophilic radicle into the α-position. Preparations of this kind are characterized above all by their remarkable washing effect which permits their use not only on very dirty and sensitive textiles without damaging the fibers, but likewise for the human skin and hairs.

The examples following hereafter, serve to illustrate our invention without limiting it, the parts being by weight:—

*Example 1.*—14 parts of α-chlorolauric acid are mixed with 10 parts of monohydroxyethylamine. The double decomposition occurs with spontaneous development of heat and is brought to completion by heating for a length of time to 100° C. A separation of the hydrochloride of the monohydroxyethylamine formed from the condensation product, may be performed with the aid of an organic solvent, but in general, this is not necessary. The product forms strongly foaming solutions in an acid, neutral or alkaline medium and may be used as a wetting agent in mercerizing lyes.

*Example 2.*—14 parts of α-bromolauric acid are treated with 19.5 parts of dihydroxyethylamine as indicated in Example 1. An end product is obtained which has properties similar to those described in Example 1.

*Example 3.*—About equimolecular proportions of oleic acid chloride are treated in the heat with hydrocyanic acid, and the condensation product is saponified in the usual manner. The α-keto-10-octodecene acid may be used under addition of 5 to 10 pe  cent. of trisodium phosphate as a dispersing or cleansing agent.

*Example 4.*—A solution of 10 to 20 parts of the sodium salt of α-ketovaleric acid dissolved in 1000 parts of a solution of sodium hydroxide of 28° Bé. is useful as a mercerizing lye for cotton.

*Example 5.*—10 parts of α-chlorolauric acid are heated under reflux for 12 hours together with 100 parts of pyridine. The pyridine in excess is separated by distillation. The product bearing in the α-position the pyridinium radicle is formed, which, even in acid solution yields a strongly foaming aqueous solution, which is applicable as washing agent.

*Example 6.*—200 parts of α-bromostearic acid are heated for 12 hours to 100° C. together with 100 parts of potassium hydroxide dissolved in 2000 parts of water. After acidification with sulfuric acid, the α-hydroxy acid is extracted by means of benzene. The free acid dissolves in hot water to a highly viscous solution. In the form of its monoglyceride the product is a highly active emulsifying agent for the preparation of pastes, ointments, and creams, especially for cosmetics.

*Example 7.*—15 parts of ethylene diamine (of 72 per cent. strength) are mixed at 30° C., while stirring, with 30 parts of α-bromolauric acid ester. Under formation of heat, the condensation begins and is completed by stirring at about 50° C. The base formed, which can be freed from admixed hydrobromide by means of an organic solvent, is easily dispersed in water, and is soluble in water in form of the acetate. It may be employed for the formation of emulsions.

*Example 8.*—40 parts of polyethylenediamine are treated as indicated in Example 7, with 37 parts of α-bromostearic acid methyl ester or with the corresponding quantity of the palmitic acid derivative. The condensation product thus formed, which may be separated from the hydrobromide of the parent base, is soluble in water and stable to all pertinent precipitating agents, such as lime or acids. It may be used as a wetting agent in alkaline baths.

*Example 9.*—30 parts of α-bromolauric acid methyl ester dissolved in 50 parts of methyl alcohol and 50 parts of water are heated for several hours under reflux with 8 parts of sodium hydroxide and 9 parts of aminopropionic acid. The condensation product thus obtained is stable to hard water and may be used as a brightening agent for viscose silk.

*Example 10.*—21.5 parts of α-bromostearic acid butyl ester dissolved in 100 parts of methyl alcohol of 50 per cent. strength, are heated under reflux together with 6 parts of sodium hydroxide and 9 parts of sarkosine until a sample dissolves clearly in water. The product may be used as a softening agent or a washing agent.

*Example 11.*—25 parts of α-bromolauric acid methyl ester are heated with 12.5 parts of the sodium salt of aminoethane sulfonic acid in the presence of xylene until condensation is at an end. A washing agent for wool is obtained which is stable to acids and hard water.

*Example 12.*—21.5 parts of α-bromostearic acid butyl ester are heated under reflux for about 8 hours together with 50 parts of methanol, 50 parts of the sodium salt of methylaminoethane sulfonic acid of 20 per cent. strength and 2 parts of sodium hydroxide. The end product may be employed in all cases where stability against calcium or magnesium salts or acids is essential.

*Example 13.*—177 parts of the sodium salt of methylaminoethane sulfonic acid are boiled, while stirring under reflux, together with a solution of 260 parts of α-bromolauric acid nitrile in isopropyl alcohol, while adding slowly 100 parts of pyridine. The reaction finished, the mixture is concentrated by evaporation and washed with benzene. The product is clearly soluble in water and yields strongly foaming solutions. It may be used as a wetting or cleansing agent.

*Example 14.*—165 parts of a mixture of amino carboxylic acids as obtainable by the complete hydrolysis of glue with an aqueous alkali are boiled under reflux with a solution of 274 parts of α-bromococinic acid nitrile, while adding simultaneously 100 parts of pyridine. When the reaction is at an end, the brownish reaction product is concentrated by evaporation and washed with benzene. The resinous body obtained dissolves in water and may be used as washing agent.

*Example 15.*—Into a mixture of 290 parts of methylaminoethane sulfonic acid of 20 per cent. strength and 200 parts of water are introduced, while stirring, at 10 to 30° C. and in separate streams, 150 parts of α-bromostearic acid bromide and 20 parts of a solution of sodium hydroxide of 50 per cent. strength, in such a manner that the reaction mixture remains continuously alkaline. After stirring for about 18 hours the mixture is diluted with water to about 1000 parts and is stirred for 12 hours at 70 to 80° C. after addition of 80 parts of caustic soda of 50 per cent. strength. Then the mixture is neutralized with sulfuric acid and evaporated to dryness. The reaction product obtained which is the sodium salt of the α-hydroxystearic acid methyl tauride, dissolves very freely in soft and in hard water.

The excellent washing capacity of the end-product can be appreciated from the following experiment.

Cotton fabrics soiled with soot, paraffine oil and olive oil, are treated, at 70° C., for 30 minutes in a bath containing the washing agent in a concentration 1:1000 and in the presence of a puffer mixture. At a pH-value of about 7 the use of the usual soap shows only a quite small washing effect, but under the same conditions a good effect when using the sodium salt of α-hydroxystearic acid; an excellent effect is attained when using the sodium salt of α-hydroxystearic acid methyltauride.

*Example 16.*—85 parts of a solution of methylaminoethane sulfonic acid of 20 per cent. strength are diluted with 100 parts of water. In this mixture at 30° C. 40 parts of α-bromostearic acid bromide and such a quantity of a caustic soda lye of 10 per cent. strength are introduced, that the mixture remains always alkaline. After stirring for some time, 150 parts of water and 60 parts of dihydroxyethylamine are added and the whole is boiled under reflux for 12 hours. The end product obtained corresponds to the formula

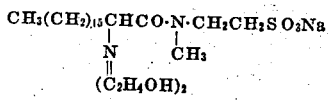

and, likewise, is an excellent washing agent which is effective at the neutral point.

*Example 17.*—33 parts of sarkosine dissolved in 200 parts of water, are slowly mixed at about 10° C. with 150 parts of α-bromostearic acid bromide and such a quantity of a caustic soda solution that the reaction remains always alkaline. When stirring is continued for some hours, 1000 parts of water and 80 parts of a caustic soda solution of 50 per cent. strength are added, the mixture is heated, while stirring, for about 12 hours to 90 to 100° C., neutralized with sulfuric acid and evaporated to dryness.

40 parts of the α-hydroxystearic acid sarkosite are rubbed with 30 parts of phosphorus pentachloride, whereby a vivid reaction occurs. The reaction product is mixed with ice, separated, washed with water and treated with 100 parts of a solution of methyltaurine of 20 per cent. strength and 100 parts of water at 30° C., an alkaline reaction being caused by slowly adding sodium hydroxide. After neutralization with sulfuric acid, the mixture is evaporated to dryness. The reaction product corresponds to the formula

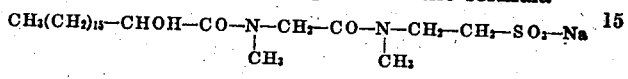

*Example 18.*—57 parts of the α-ketotridecyl acid chloride (prepared from α-ketotridecylic acid and thionylchloride) are mixed with 44 parts of the sodium salt of hydroxy ethane sulfonic acid and heated to 120 to 130° C. The evolution of hydrochloric acid being finished, a product is obtained which is pulverized and neutralized with sodium carbonate. The yield is 92 parts containing 80 to 85 per cent. of active substance. After recrystallization, the sodium salt of the α-ketotridecyl acid ester of the hydroxy ethane sulfonic acid is obtained in the pure form.

What we claim is:—

1. The process of treating textiles and other fibrous materials with an aqueous liquor in the presence of a compound containing the chemical grouping

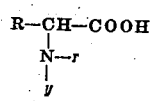

wherein R is an alkyl radicle of at least 10 carbon atoms, $x$ is a member of the group consisting of hydrogen, alkyl and hydroxyalkyl and $y$ is an alkyl radicle with at most 3 carbon atoms containing a salt forming substituent of the group consisting of —OH, —COOH, and —SO₃H.

2. The process of treating textiles and other fibrous materials with an aqueous liquor in the presence of a compound containing the chemical grouping

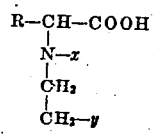

wherein R is an alkyl radicle of at least 10 carbon atoms, $x$ is a member of the group consisting of hydrogen, alkyl and hydroxyalkyl and $y$ is a salt-forming substituent of the group consisting of —OH, —COOH and —SO₃H.

3. The process of treating textiles and other fibrous materials with an aqueous liquor in the presence of a compound containing the chemical grouping

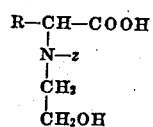

wherein R is an alkyl radicle of at least 10 carbon atoms and $z$ is a member of the group consisting of hydrogen and hydroxyalkyl.

4. The process of treating textiles and other fibrous materials with an aqueous liquor in the presence of a compound containing the chemical grouping $$R-CH-COOH$$
$$|$$
$$NH$$
$$|$$
$$CH_2$$
$$|$$
$$CH_2$$
$$|$$
$$SO_3H$$

wherein R is an alkyl radicle of at least 10 carbon atoms.

5. The process which comprises treating textiles and other fibrous materials with an aqueous liquor in the presence of an alkali metal salt of an α-(hydroxyethylamino)-lauric acid of the general formula $$C_{10}H_{21}-CH-COOH$$
$$|$$
$$N-z$$
$$|$$
$$CH_2CH_2OH$$

wherein z is a member of the group consisting of hydrogen and hydroxyalkyl.

6. The process which comprises treating textiles and other fibrous materials with an aqueous liquor in the presence of an alkali metal salt of α-(monohydroxyethylamino)-lauric acid of the formula $$C_{10}H_{21}-CH-COOH$$
$$|$$
$$NH$$
$$|$$
$$CH_2CH_2OH$$

7. The process which comprises treating textiles and other fibrous materials with an aqueous liquor in the presence of an alkali metal salt of α-(dihydroxyethylamino)-lauric acid of the formula $$C_{10}H_{21}-CH-COOH$$
$$|$$
$$N-CH_2CH_2OH$$
$$|$$
$$CH_2CH_2OH$$

ALFRED RIECHE.
KARL BRODERSEN.
MATTHIAS QUAEDVLIEG.
HANS MAIER-BODE.